United States Patent [19]
Antonio et al.

[11] 3,964,340
[45] June 22, 1976

[54] HAND GRIP HAVING AN INNER HUB

[75] Inventors: Anthony I. Antonio, Somerville, N.J.; Fernando V. Guerrero, Yardley, Pa.

[73] Assignee: Air Products and Chemicals, Inc., Allentown, Pa.

[22] Filed: May 19, 1975

[21] Appl. No.: 578,453

[52] U.S. Cl............................ 74/551.9; 285/DIG. 22; 403/297
[51] Int. Cl.²......................................... B62K 21/26
[58] Field of Search................ 74/551.9, 558.5, 558; 403/297

[56] References Cited
UNITED STATES PATENTS

| 450,906 | 4/1891 | Blakely | 74/551.9 |
|---|---|---|---|
| 1,421,098 | 6/1922 | Phillips | 74/551.9 |
| 2,618,986 | 11/1952 | Hungerford | 74/551.9 |

FOREIGN PATENTS OR APPLICATIONS

| 970,663 | 1/1951 | France | 74/551.9 |
|---|---|---|---|
| 52,871 | 2/1942 | Netherlands | 74/551.9 |

Primary Examiner—Benjamin W. Wyche
Assistant Examiner—F. D. Shoemaker
Attorney, Agent, or Firm—Russell L. Brewer; Barry Moyerman

[57] ABSTRACT

This invention relates to an approved grip which is placed over a tubular handle bar such as for example on a bicycle handle bar. The grip comprises a tubular grip section having an outer shell and an inner expandable hub communicating with an end of the grip section. There is a space between the outer shell and inner hub so that the handle bar can be inserted into the grip section and between the outer shell and inner hub. The hub has an aperture tapering from its largest dimension at the end of the grip section communicating with said hub to its narrowest dimension at its other end. A cylindrical core having a diameter slightly smaller than the tapered aperture at its largest dimension and a larger diameter at its narrowest dimension has a groove extending circumferentially about the exterior for defining a lip section. When the core is inserted into the aperture, the hub is expanded and the lip section can engage the end of the hub and provide a tight seal.

2 Claims, 4 Drawing Figures

HAND GRIP HAVING AN INNER HUB

BACKGROUND OF THE INVENTION

As is known, tubular bars, e.g., handle bars are widely used for hand guided equipment such as bicycles, tricycles, motor scooters, motorcycles, hammers, ski poles and the like. Flexible grips have been provided on such tubular bars in order to provide comfort to the user and to permit grasping by the hand. Generally, these grips are tubular shaped and adapted to slip over the end of the tubular bar. These grips then are glued or rely on frictional engagement with the bar to hold them in place.

DESCRIPTION OF THE PRIOR ART

It has been proposed to provide a fastening means for handle bar grips whereby the grips can be securely fastened to the bars without the use of glue. Basically this technique comprises inserting a plug into the end of the handle bar and inserting a screw through the end of the handle bar and securing it to the plug. The screws also serve to expand the plug for engagement with the wall of the handle bars.

SUMMARY OF THE INVENTION

Basically, this invention relates to an improved hand grip for placement over the end of a tubular bar e.g., a handle bar. The grip comprises:

a tubular grip section having an outer shell slightly larger in diameter than the tubular bar so that the tubular bar can be inserted into the tubular grip section and an inner expandable hub having a generally cylindrical shaped body of slightly smaller diameter than said tubular bar and communicating with an end of a grip section for providing a space between the outer shell and said hub to permit insertion of the tubular bar therebetween, said inner hub having a tapered aperture with the largest dimension at the end of the grip section communicating with said hub to its narrowest dimension at its other end; and a generally cylindrical core having a diameter slightly smaller than said tapered aperture at its largest dimension but a slightly larger diameter than said tapered aperture at its narrowest dimension, a rounded face section at one end of said core for sealing engagement with said end of said grip section, and a groove spaced apart from the face section and extending circumferentially about the exterior of said core for defining a lip section, the distance between said face section and said lip section on said core being slightly greater than the length of said hub, whereby when said core is inserted into said hub, the face section of said core is in sealing engagement with the end of said grip section and said lip section is in engagement with the other end of said hub.

Advantages of this invention include a grip for a tubular handle bar which is extremely difficult to remove if not impossible without destroying the grip, and a grip which provides protection to the user by sealing the ends of the handle bars for preventing cuts and the like.

THE DRAWINGS

DESCRIPTION OF THE PREFERRED EMBODIMENTS

Figure 1:
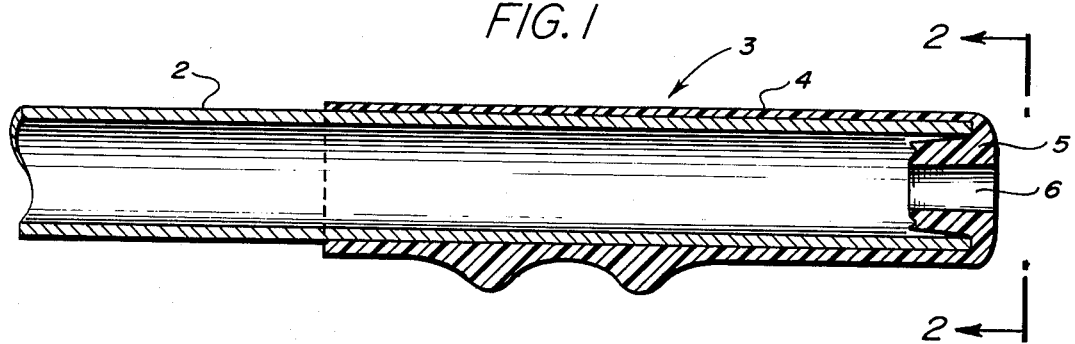
FIG. 1 is a view in cross-section of a handle bar with the grip section placed over the bar.
Figure 2:
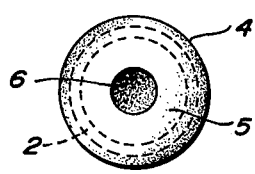
FIG. 2 is an end view as seen from plane 2—2 of the handle bar and grip shown in FIG. 1.

Referring to the drawings, FIG. 1 is a view in cross-section of a tubular bar e.g., a handle bar and bicycle grip. Tubular bar 2 is generally circular in shape and has a flexible grip section 3 placed thereover to permit grasping of the bar by the hand. Grip section 3 is tubular so that it can be placed over the end of handle bar 2 and comprises an outer shell 4 and an inner hub 5 communicating with the outer shell. The communication of outer shell 4 with inner hub 5 serves to seal the end of handle bar 2 thereby protecting the user from the sharp end of the handle bar. Inner hub 5 has a diameter slightly smaller than the inside diameter of tubular bar 2 so that tubular bar 2 can be inserted in the space between outer shell 4 and inner hub 5. It also has an aperture 6 tapering from its largest dimension at the end of the grip section to its narrowest dimension at its opposite end. Thus, when grip section 3 is placed over handle bar 2 outer shell 4 conforms to the outside diameter of handle bar 2 and inner hub 5 is positioned inside for sealing the end of the handle bar. This aspect is clearly shown in FIG. 2.

Figure 3:
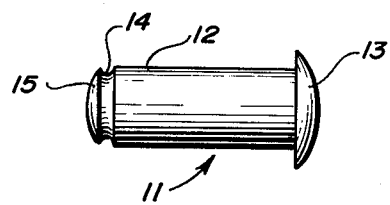
FIG. 3 is a side view of the core.
Figure 4:
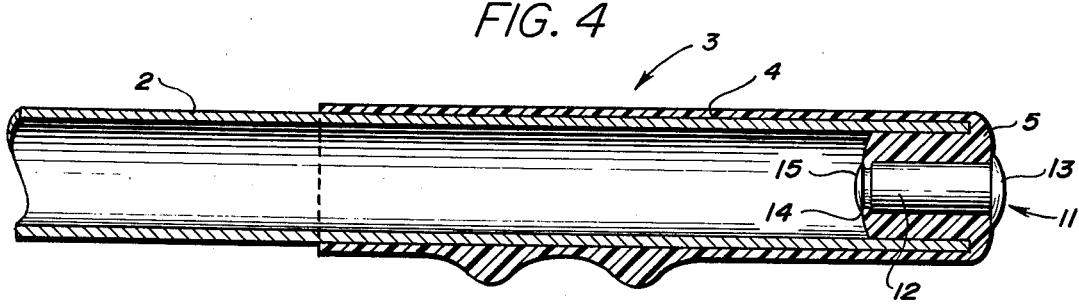
FIG. 4 is a view of the handle bar and grip of FIG. 1 with the core of FIG. 3 inserted into the hub of the grip section for sealing engagement with the handle bar.

Referring to FIG. 3, core 11 has a generally cylindrical, solid shaft 12 which is smaller in diameter than the largest dimension, but larger than the narrowest dimension of tapered aperture 6. Shaft 12 is bordered at one end by a rounded or mushroom shaped face section 13 with the face conforming to the shape of grip section 3 where outer shell 4 and inner hub 5 communicate. Spaced apart from rounded face section 13 is groove 14 extending circumferentially about shaft 12 for defining lip section 15. The distance between rounded face section 13 and lip section 15 is slightly greater than the length of inner hub 5 from its point of communication with outer shell 4 to its opposite end. Thus, when core 11 is driven into inner hub 5, as shown in FIG. 4, thereby forming the complete grip, core 11 causes hub 4 to expand, by virtue of shaft 12 having a diameter larger than the narrowest dimension of tapered aperture 6, for sealing engagement with the inside wall of tubular bar 2. Rounded face section 13 is firmly wedged against the end of grip section 3 and provides a smooth surface at the end of tubular bar 2 in order to protect the user. The face section can have other shapes but arcuate or rounded surfaces are preferred. Lip section 15 engages the opposite end of inner hub 5 for preventing core 11 from being removed from the hub.

Core 11 provides for a sealing expansion of lip section 3 and inner hub 5 against tubular handle bar 2 in the following way. Shaft 12 by virtue of its being wedged in tapered aperture 6 effects expansion of inner hub 5 perpendicular to the longitudinal axis of the shaft. The space that was originally between the inside diameter of tubular handle bar 2 and inner hub 5 is removed by the expansion of inner hub 5 against the handle bar. Sealing engagement of core 11 in inner hub 5 is effected by compression of rounded face section 13 against the end of grip section 3 and engagement of lip section 15 with the opposite end of inner hub 5. Because tapered aperture 6 at the end of inner hub 5 is smaller in diameter than shaft 12, and because core 11 is slightly longer than hub 5, hub 5 nestles in groove 14 and lip section 15 expands by virtue of its being outside of tapered aperture 6 and locks against the end of hub 5. Cores not having a lip section can work their way out of the hub or be pried loose by small children.

The grip comprising the combination of the grip section and core as described above provides for substantial frictional engagement with the tubular handle bar and is virtually impossible to remove. Because of the excellent locking adherence of the core to the inner hub, the grips are firmly secured to the handle bar and safety and protection is provided to the user.

The grip which include the grip section and core, generally are made of elastomeric materials. The hub should be made of an expandable material so that it can engage the tubular handle bar. Typical material suited for manufacturing the grip section including the hub include flexible vinyl chloride, polyethylene, ethylene-vinyl acetate, rubber, e.g., SBR and other soft plastics or elastomers. The core, on the other hand, can be made of an expandable material; however it should be rigid enough to effect expansion of the hub when inserted therein. Suitable materials for making the core include steel and other metals, flexible vinyl or rigid vinyl chloride, polyethylene, polypropylene, nylon, and any other rigid or semi-rigid plastics.

What is claimed is:

1. A hand grip for a tubular bar adapted for hand-guided equipment which comprises:

a tubular grip section having an outer shell slightly larger in diameter than said tubular bar so said bar can be inserted into said tubular grip, and an inner expandable hub having a generally cylindrically shaped body of slightly smaller diameter than said tubular bar and communicating with an end of the grip section for providing a space between said outer shell and said inner hub to permit insertion of the tubular bar therebetween, said inner hub having a tapered aperture with the largest dimension at the end where said hub communicates with said grip section to its narrowest dimension of its other end; and a solid generally circular core having a slightly smaller diameter than said tapered aperture at its largest dimension but a slightly larger diameter than said aperture at its narrowest dimension, a rounded face section at one end of said core for sealing engagement with the end of said grip section, and a groove spaced apart from said face section and extending circumferentially about the exterior of said core for defining a lip section, the distance between said face section and said lip section being slightly greater than the length of said inner hub, whereby when said core is inserted into said hub, the face section of said core is in sealing engagement with the end of said grip section and said lip section is in engagement with the other end of said hub.

2. The hand grip of claim 1 wherein said grip section and said core are made of vinyl chloride.

* * * * *